Jan. 5, 1965  M. B. ADAMS, JR  3,164,144
CUTTING APPARATUS
Filed May 3, 1963  2 Sheets-Sheet 1

INVENTOR.
MADISON B. ADAMS, JR
BY
Cushman, Darby & Cushman
ATTORNEYS

INVENTOR.
MADISON B. ADAMS, JR.
BY
Cushman, Darby & Cushman
ATTORNEYS

# United States Patent Office 3,164,144
Patented Jan. 5, 1965

3,164,144
CUTTING APPARATUS
Madison B. Adams, Jr., 1701 2nd Ave. N.,
Jacksonville Beach, Fla.
Filed May 3, 1963, Ser. No. 277,807
11 Claims. (Cl. 125—13)

This invention relates generally to cutting materials and more particularly to a novel apparatus for cutting masonry materials such as marble, stone, brick, tile and the like along a predetermined curved line.

In the past, it has been the practice in cutting curved shapes in masonry materials such as a slab of marble, to cut the slab with a flat masonry blade along straight cuts tangent to the desired curved configuration and then to smooth off the small vertexes between adjacent tangents by filing and grinding operations. This prior art method for cutting a slab of marble is both time consuming and tedious and the curved surfaces so formed frequently do not have the squared edges and accuracy desired. Band saws and wire saws have been employed for cutting such masonry materials along curved lines, but such saws leave a rough edge which necessitates extensive subsequent finishing operations. In addition where it has been desired to cut circular forms in masonry materials it has been proposed to utilize a dish-shaped masonry blade, wherein the radius of curvature of the blade corresponds to the radius of the circle being cut. Not only is the use of such dish-shaped blades limited to the cutting of circular forms, i.e., configurations having a constant radius of curvature, but it is necessary to employ different blades for cutting circles of different diameters. The limitations of the prior art have become particularly acute with the recently increased demand for masonry materials, particularly marble slabs, having various curved configurations. Frequently the desired configurations require that the material be cut in a complex curve wherein the radius of curvature varies at different points along the cut. For example it has become increasingly popular to employ marble slabs as counter tops for use in bathrooms. Typically, the marble counter top will be provided with an opening, elliptical in shape, which is adapted to receive and mount a suitable basin. Similarly, masonry slabs having various curved configurations both in the form of openings therein and outer shapes, are in considerable demand for a wide variety of other uses such as table tops, fireplaces, wall and surface coverings, ornamentation, lamp bases and the like. In these various applications it is most desirable that the curved surfaces be accurately formed and that the edges of the material be squared, i.e., perpendicular to the parallel faces of the slab, so as properly fit with cooperating parts and present a neat attractive appearance. The aforementioned practices and devices of the prior art not only require relatively expensive complex cumbersome procedures and apparatus but frequently cannot satisfactorily produce the complex curved configurations desired.

Therefore, the principal object of the present invention relates to a novel apparatus for cutting materials along a predetermined curved line.

Another object of the present invention relates to an apparatus for cutting a slab of masonry material along a predetermind curved line having varying radii of curvature.

An additional object of the present invention relates to a novel apparatus for cutting holes of predetermined configuration in masonry materials.

A further object of the present invention relates to a novel apparatus for cutting holes of a predetermined curvilinear configuration having varying radii of curvature.

Another object of the present invention relates to a novel apparatus for cutting elliptical holes in marble slabs.

A still further object of the present invention relates to a novel apparatus for cutting masonry materials so as to provide the same with a predetermined curved configuration having squared edges.

Other objects and the entire scope of the present invention will become apparent from the following detailed description and by reference to the accompanying drawing. It should be understood, however, that the detailed description and specific examples, while indicating preferred embodiments of the invention, are given by way of illustration only, since various changes and modifications within the spirit and scope of the invention will become apparent as the description herein progresses.

Reference is now made to the accompanying drawings which form a part hereof, wherein like numerals refer to like parts throughout:

FIGURE 5 is a view in plan showing the roller and track arrangement for pivotally suspending the motor and blade assembly.

Figure 1:
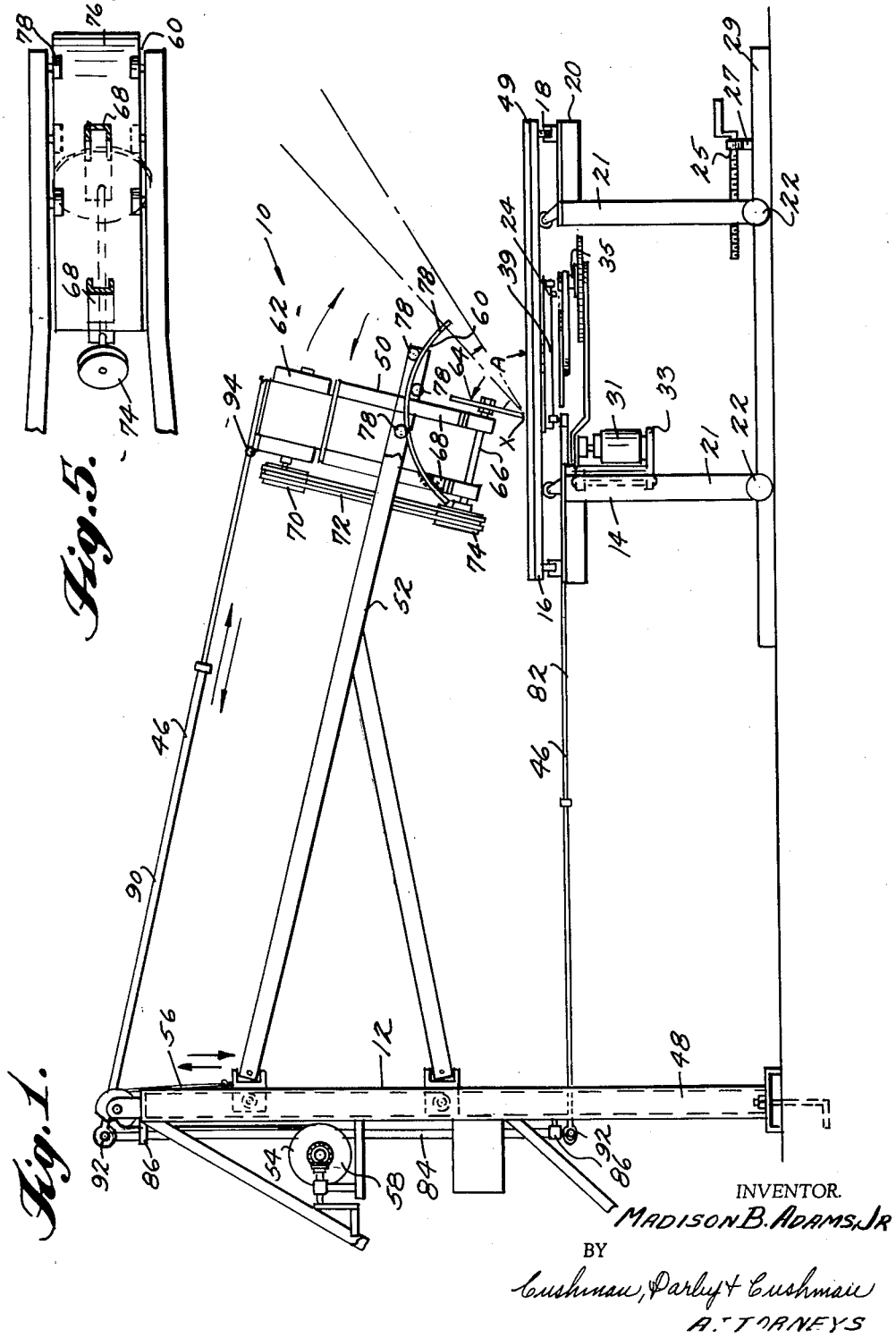
FIGURE 1 is a view in side elevation of my novel apparatus.
Figure 2:
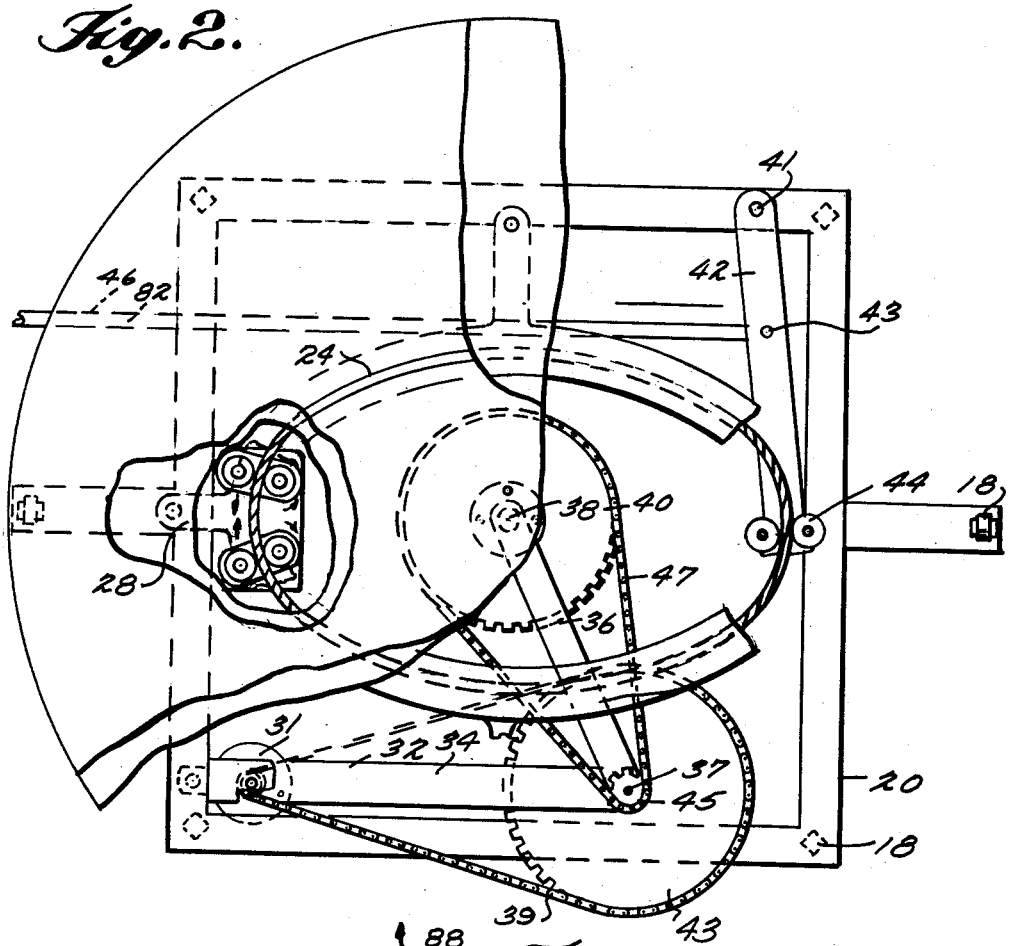
FIGURE 2 is a view in plan, with parts broken away, showing the workpiece supporting turntable assembly of my novel apparatus.

In FIGURE 1, numeral 10 indicates my novel cutting apparatus which generally comprises a workpiece supporting turntable assembly 14 and a tilting cutter suspension assembly 12.

The workpiece supporting turntable assembly 14 includes a suitable frame structure 20 having legs 21 mounting rollers 22 which engage the floor supporting surface. The turntable assembly 14 which is bodily movable on rollers 22 to various positions relative to the cutter assembly 12, is secured in the desired position by means of a suitable latch assembly 25. The latch assembly 25 preferably comprises a locking member 27 mounted on the frame 20 which is adapted to operatively engage a cooperating member 29 mounted on the floor supporting surface.

The upper portion of the frame structure 20 mounts a plurality of pivotable rollers or casters 18. The casters 18 are each pivotable about a vertical axis and rotable about a horizontal axis and are suitably spaced so as to stably and movably support a workpiece supporting turntable 16. Attached to the underside of the turntable 16 is a removable cam or pattern track 24 which has a configuration corresponding to the shape of the cut to be made. While the shape of the pattern track 24 must be the same as the shape of the cut to be made, it is not necessary that the size of the configuration or figure formed by the pattern track be the same as the size of the configuration to be cut. Two pair of cam or track follower rollers 26, rotatably mounted on pivotable plates 28, rollingly engage the inner and outer vertical peripheral surfaces of pattern track 24. The plates 28 are pivotably mounted on the frame 20 by means of suitable bearing pins 30 secured to the frame 20. The pairs of rollers 26 are thus free to pivot on their respective bearing pins 30 so as to accommodate the varying radius of curvature of the pattern track 24 and remain in operative rolling engagement therewith as the pattern track 24 passes between the rollers 26.

The inner and outer periphery of the pattern track 24 is also operatively engaged by a tilt regulator assembly which includes a pair of tilt regulator followers 44 which are mounted on an arm 42 pivotally secured at 41 to the frame 20. A member 82 of the tilt regulator linkage 46 is pivotably secured to the arm 42 at 43. The tilt regulator linkage 46 is operatively connected to the tilting cutter suspension assembly 12 in a manner to be more fully described hereinafter.

A suitable power source, preferably a geared universal motor 31 is mounted on a swinging bracket assembly 33 which is pivotally secured to the frame 20. The motor 31 is preferably controlled by a variable transformer (not shown) so as to provide a wide selection of speeds. The power train arrangement for driving the turntable 16 preferably comprises a roller chain and sprocket arrangement which includes a jointed arm assembly 32 so as to maintain constant chain tension throughout the path of movement of the turntable 16. The jointed arm assembly includes a first arm 34 pivotally secured to the frame 20, preferably by being mounted on the swinging bracket assembly 33. The second arm 36 is pivotably connected to the first arm 34 at 37. A shaft 35, carrying two connected chain sprockets 43 and 45, is rotatably mounted at the pivotal connection 37 of the arms 34 and 36. A shaft 38, operatively mounting a suitable chain sprocket 40, is secured to the bottom of the turntable 16 and is rotably journalled in the arm 36. A suitable roller chain 39 operatively connects roller sprocket 41 mounted on the motor shaft to roller sprocket 43 mounted on shaft 35. A second roller chain 47 operatively connects the roller sprocket 45 to roller sprocket 40.

A workpiece 49, such as a slab of marble or the like, is clamped by suitable means (not shown) on the upper surface of turntable 16. When the motor 31 is energized the rotative power will be imparted to the turntable shaft 38 through the aforedescribed roller chain and sprocket arrangement. Since the pattern track 24, which is secured to the turntable 16, is in operative co-operating engagement with the track follower rollers 26, the turntable will move through a patern or path having the same shape as the pattern track 24. In the embodiment illustrated in the drawings since the pattern track is elliptical the turntable 16 and therefore the workpiece 49 secured thereto, will move in an elliptical pattern or path. Thus a point contacting the upper surface of the workpiece 49 will trace an ellipse thereon during a complete cycle of movement of the turntable 16.

Although a chain and sprocket turntable drive has been particularly described, it will be clear to those skilled in the art that other drive arrangements may be employed. Thus a belt and pulley drive arrangement could be utilized instead of the aforementioned chain and sprocket drive.

Spaced above the turntable 16 a tilting motor and blade assembly 50 is operatively suspended by a suitable arm assembly 52. The arm assembly 52 is operatively mounted on, and extends laterally of, a suitable arm support means 48. The arm support means 48 may preferably comprise vertically extending channel members securely mounted on the floor supporting surface. The arm assembly 52 is vertically adjustable of the arm support means 48 by means of a suitable vertical adjustment means 54. The vertical adjustment means 54, illustrated in the drawings, comprises a cable 56 operatively connecting the arm assembly 52 with a worm drive crank operated winch 58.

The motor and blade assembly 50 consists essentially of a motor 62 and a flat planar circular masonry blade 64 mounted on a shaft 66 driven by the motor through a suitable pulley and belt arrangement. The shaft 66 is rotatably journalled in suitable bearings carried by stanchion members 68 which are secured to the motor 62. Thus, the stanchions 68 will be seen to retain the shaft 66 and the motor 62 in the desired spaced relation. A suitable belt arrangement 72 operatively connects the motor drive pulley 70 carried by the motor shaft, to the driven pulley 74 carried by the blade mounting shaft 66.

As best seen in FIGURES 1 and 5, the motor assembly is pivotally suspended for arcuate tilting movement from the arm assembly 52 by means of a suitable suspension assembly generally indicated by the numeral 60. The rotatable suspension assembly 60 is such that the blade 64 is rotatable or pivotable in a vertical plane about a horizontal axis X, formed by the intersection of the plane of the blade 64 with a plane tangent to the lowermost work-engaging peripheral extent of the blade 64. Thus the lowermost work-engaging peripheral extent of the blade 64 will remain at one point in space while the vertical angle between the plane of the blade 64 and the plane of the upper surface of the workpiece 49 is varied so as to accommodate the varying radius of curvature in the configuration being cut.

The suspension assembly 60 preferably includes an arcuate track member 76 of suitable shape secured to the stanchions 68 which mount the motor 62 and cutting blade 64. The arcuate track member 76 operatively engages a plurality of rollers 78 mounted on the arm assembly 52. The rollers 78 will be seen to be arranged in staggered relationship, so as to alternately engage the upper and lower surfaces of the track member 76 and thereby positively retain the track member 76 in operative engagement therewith. Of course the arcuate track member 76 is of such curvature and so located with respect to the blade 64 that the blade will pivot or tilt about axis X, as aforementioned.

During the cutting operation the tilt angle, A, between the blade 64 and the workpiece 49 must be such as to accommodate the varying radius of curvature of the cut, so that the blade 64 does not overcut the material and cuts the workpiece slab 49 along a cut which is substantially perpendicular to the faces of the slab 49. Where, as in cutting an elliptical configuration, the radius of curvature of the pattern varies at different portions of the cut, the angle A between the blade 64 and the slab 49 must be adjusted simultaneously with a change in the radius being cut. The tilt angle A between the blade 64 and the upper surface of the workpiece 49 is varied in a predetermined controlled manner so as to accommodate the radius of curvature being cut by means of a tilt regulator assembly. The tilt regulator assembly includes a tilt regulator linkage 46 which operatively connects the motor and blade assembly 50 to the arm 42 carrying the tilt regulator followers 44 which operatively engage the pattern track 24. The tilt regulator linkage preferably comprises a first generally horizontally extending connecting member 82 which connects the arm 42 with a vertically extending member 84 operatively mounted on the arm support means 48. The connecting member 82 is preferably a telescoping tubular arrangement so as to be adjustable in length in order to accommodate various positions of the turntable assembly 14 with respect to the tilting cutter suspension assembly 12.

Figures 3, 6:
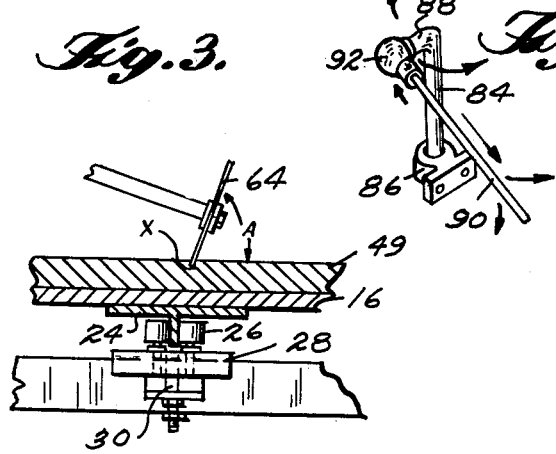
FIGURE 3 is a side view partly in section showing details of the pattern track and track follower assembly of my novel apparatus.
FIGURE 6 is a view in perspective showing a pivotal connection in the tilt regulator linkage.
Figure 4:
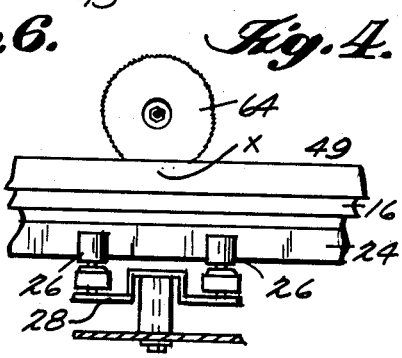
FIGURE 4 is a front view partly in section of the track and follower assembly shown in FIGURE 3.

The vertically extending member 84 is rotatably mounted on the arm support means 48 by vertically spaced, suitable bearing brackets 86. As best seen in FIGURES 1 and 6, member 84 is provided at each end with angularly offset radially extending leg portions 88 which are pivotally connected to the connecting member 82 and cutter tilt actuating member 90 by a suitable pivotable joint means 92. The cutter tilt actuating member 92 is operatively connected by a pivotable joint means 94 to the upper portion of the motor and blade assembly 50. Thus, as the turntable 16 moves through the desired path determined by the cooperation of the pattern track 24 and the track follower rollers 26, the blade 64 will be tilted to the desired cutting angles by means of the tilt linkage 46 responding to the movement of the arm 42 and the tilt regulator followers 44 which operatively engage, and are moved laterally by the pattern track 24.

In the embodiment of my novel apparatus illustrated in the drawings wherein an elliptical pattern track is utilized for cutting an elliptical hole in a masonry slab, the tilt regulator followers 44, for coordinating the tilt angle of the blade 64 with the radius of curvature being cut, are located on the side of the track and turntable laterally opposite the pattern track followers 26. When pattern tracks having other curved configurations are employed, various modifications of the tilt regulator assembly may be necessary in order to properly coordinate the tilt angle of the blade 64 with the radius of curvature being cut. The particular modifications of the tilt regulator assembly will of course depend upon the particular pattern track configuration and will be apparent to those skilled in the art.

In operation the workpiece supporting turntable assembly 14 is located in the desired position relative to the tilting cutter suspension assembly 12 and secured in such position by means of the latch assembly 25. It should be noted that the turntable assembly 14 is positioned relative to the cutting blade 64 such that the pivot or tilt axis X of the blade 64 lies in a line which is parallel to a line joining the pattern track receiving space between each pair of the two pair of track followers 26. The motors 31 and 62 are energized and the cutting blade 64 is brought into operative cutting engagement with the workpiece slab 49 by means of vertical adjustment means 54. By virtue of the cooperation of the elliptical pattern track 24 and cam followers 26 arrangement the workpiece slab 49 will be moved, in the illustrated embodiment, in an elliptical path. Thus the cutting blade 64 which cuttingly engages the workpiece at an essentially point contact will generate a cut having an elliptical configuration. Furthermore, the tilt angle A at which the blade 64 engages the workpiece will be continuously adjusted to accommodate the varying radius of curvature of the configuration being cut so as to avoid overcutting, i.e., cutting the workpiece beyond the desired line of cut, and cut the workpiece slab 49 along a cut which is substantially perpendicular to the faces of the slab. Thus, it will be noted that as the radius of curvature being cut decreases the coordinated tilt angle A of the blade will decrease, that is, the blade 64 will be inclined more towards the center of the configuration being cut. As the cutting operation progresses, the blade 64 will be moved deeper and deeper into the slab by vertically lowering the same by the vertical adjustment means 54 until the cut extends through the thickness of the slab and, in the illustrated embodiment, an elliptical hole in the slab is produced.

While it is apparent that my novel apparatus is particularly adapted for cutting material along a predetermined curved line having various radii of curvature, it may also be advantageously used to cut material in a predetermined curved line having a constant radius of curvature, such as a circle, simply by employing a circular pattern track.

The present invention will thus be seen to completely and effectively accomplish the objects enumerated hereinabove. My novel apparatus will cut a masonry slab, such as marble, along a predetermined curved line having varying radii of curvature to provide an accurately formed configuration with edges prependicular to the surface of the slab. Furthermore, my novel apparatus is of simple construction and permits curved configurations of various sizes having varying radii of curvature to be cut, utilizing a single conventional flat circular masonry cutting blade.

It will be realized, however, that various changes and substitutions may be made to the specific embodiments disclosed herein for the purposes of illustrating the principles of this invention without departing from these principles. Therefore, while the present invention has been described with particular reference to the specific forms shown in the drawings, it is to be understood that such is not to be construed as imparting any limitations upon this invention, which includes all modifications encompassed within the spirit and scope of the following appended claims.

I claim:

1. Apparatus for cutting material along a predetermined curved line comprising in combination, movable support means for supporting the material to be cut, support moving means for moving said support means in a path having the configuration of the predetermined curved line cut to be made, a substantially flat planar circular cutting blade spaced above said support means a distance sufficient to receive said material to be cut, means to move said cutting blade into operative cutting engagement with the material to be cut and means coordinated with the movement of said support means for pivoting said blade in a direction perpendicular to the plane of said blade and about a point lying in the lowermost peripheral extent of said blade whereby said blade will cuttingly engage said material at a predetermined angle coordinated with the radius of curvature of the predetermined curved line being cut so as to cut said material along said predetermined curved line.

2. An apparatus as set forth in claim 1 wherein said support moving means includes a cam having the same shape as the curved line to be cut, said cam being secured to said movable support means and cam follower means mounted on a stationary frame and operatively engaging said cam.

3. An apparatus for cutting a slab of masonry material of predetermined thickness along a predetermined curved line having varying radii of curvature comprising in combination, support means for supporting the slab of masonry material to be cut, a substantially flat planar circular masonry cutting blade spaced above said support means a distance sufficient to receive said slab of masonry material to be cut, means for effecting relative movement between said support means and said blade in a lateral path having the same shape as the predetermined curved line to be cut, means to move said blade into operative cutting engagement with the slab of masonry material to be cut and means operating in coordination with said means for effecting relative movement between said support means and said blade for pivoting said blade in a direction perpendicular to the plane of said blade and about a point lying in the lowermost peripheral extent of the cutting edge of said blade whereby said blade will cuttingly engage said slab of masonry material at various predetermined angles coordinated with the radius of curvature of the predetermined curved line being cut.

4. An apparatus for cutting a slab of masonry material of predetermined thickness along a predetermined curved line having varying radii of curvature comprising in combination a workpiece supporting turntable, a frame movably supporting said turntable, turntable moving means for moving said turntable and workpiece in a path having the same shape as the predetermined curved line cut to be made, a cutter support means a flat planar circular masonry cutter mounted on said cutter support means for rotation on a naxis perpendicular to the plane of said cutter, said cutter being spaced above said turntable a distance sufficient to receive the workpiece to be cut, means operatively associated with said cutter support means to move said cutter into operative cutting engagement with the workpiece and cutter tilting means operatively associating said turntable with said cutter for angularly rotating said cutter relative to the surface of said workpiece in a direction perpendicular to the plane of the cutter and about a point lying in the lowermost peripheral extent of the cutting edge of said cutter whereby said cutter will cuttingly engage said workpiece at predetermined angles continuously coordinated with the radius of curvature of the curved line being cut so that said cutter will cut said workpiece along said predetermined curved line.

5. An apparatus as set forth in claim 4 wherein said turntable moving means includes a cam having the same shape as the curved line to be cut, said cam being fixed to the turnable and cam follower means fixed to said frame operatively engaging said cam whereby said turntable is guided in said path having the shape of the curved line to be cut.

6. An apparatus as set forth in claim 5 wherein said cutter tilting means includes second cam follower means operatively engaging said cam.

7. An apparatus as set forth in claim 6 wherein said cam is elliptical in shape.

8. An apparatus as set forth in claim 5 wherein said turntable movable means also includes a motor mounted on said frame, power transmission means mounted on said frame and means operatively connecting said motor to said turntable through said power transmission means.

9. An apparatus as set forth in claim 8 wherein said power transmission means includes a pivotally jointed arm assembly pivotally mounted on said frame, chain sprockets operatively mounted on said jointed arm assembly and chain means operatively connecting said motor to said turnable through said chain sprockets whereby said chain means remain under constant tension during the movement of said turntable.

10. An apparatus for cutting a hole having a predetermined curvilinear configuration in a masonry slab comprising in combination a workpiece supporting turntable, a frame movably supporting said turntable, turntable moving means for imparting lateral movement to said turntable, cam means and cam follower means operatively associating said turnable and said frame so as to determine the path of movement of said turntable, said cam means having the same shape as the curvilinear configuration to be cut so that said turntable is moved in a path having the same shape as the configuration to be cut, a substantially flat planar circular masonry cutting blade spaced above said turntable a distance sufficient to receive the workpiece to be cut, means to move said masonry cutting blade into operative cutting engagement with the masonry slab to be cut and cutter tilting means operatively associating said cutting blade with said cam means for angularly rotating said cutting blade relative to the surface of the workpiece in a direction perpendicular to the plane of the cutting blade and about a point lying substantially in the lowermost peripheral extent of the cutting edge of said cutting blade whereby said cutting blade will cuttingly engage the workpiece at predetermined angles continuously coordinated with the radius of curvature of the hole being cut so that said cutting blade will not cut the workpiece beyond the predetermined curvilinear configuration of the hole being cut.

11. An apparatus as set forth in claim 10 for cutting an elliptical hole wherein said cam means has an elliptical configuration.

References Cited in the file of this patent
UNITED STATES PATENTS

| | | |
|---|---|---|
| 397,888 | Barras | Feb. 19, 1889 |
| 462,760 | Evans | Nov. 10, 1891 |
| 1,326,462 | Murch | Dec. 30, 1919 |
| 2,320,743 | Nilsen | June 1, 1943 |
| 2,804,065 | Ghiglieri | Aug. 27, 1957 |

FOREIGN PATENTS

| | | |
|---|---|---|
| 17,872 | Great Britain | Aug. 18, 1903 |